United States Patent [19]

Chen et al.

[11] 4,364,260
[45] Dec. 21, 1982

[54] ENGINE WITH KNOCK SENSING APPARATUS HAVING MULTIPLE FREQUENCY TUNING

[75] Inventors: Francis H. Chen, Troy; Douglas A. Feldmaier, Bloomfield Hills; James A. Hamburg, Southfield, all of Mich.

[73] Assignee: General Motors Corporation, Detroit, Mich.

[21] Appl. No.: 243,882

[22] Filed: Mar. 16, 1981

[51] Int. Cl.³ .............................................. G01L 23/22
[52] U.S. Cl. ....................................................... 73/35
[58] Field of Search ...................... 73/35; 123/425, 435

[56] References Cited

U.S. PATENT DOCUMENTS

3,393,557 7/1968 Brown et al. ............................ 73/35
4,061,116 12/1977 Saida et al. ............................ 123/425
4,316,440 2/1982 Yamaguchi et al. ................ 73/35 X

Primary Examiner—James J. Gill
Attorney, Agent, or Firm—Robert M. Sigler

[57] ABSTRACT

A spark ignited internal combustion engine includes knock sensing apparatus comprising vibration sensing apparatus having a portion mounted on an engine component for vibration therewith and a tuned response to vibrations of a plurality of the acoustic cavity resonance frequencies of the engine cylinders. A separate signal processing channel is provided for the sensor output at each of the frequencies to indicate significant vibrations at the respective frequency. Coincidence means fed by all channels produce an engine knock signal only when significant vibrations are detected on all channels simultaneously.

2 Claims, 31 Drawing Figures

TIME DATA

Fig. 2a

CYLINDER PRESSURE

Fig. 2b

VIBRATION SENSOR OUTPUT

Fig. 2c

FILTERED FIRST MODE

Fig. 2d

FILTERED THIRD MODE

TIME (MILLISECONDS)

FREQUENCY DATA

FREQUENCY KHz

ENGINE WITH KNOCK SENSING APPARATUS HAVING MULTIPLE FREQUENCY TUNING

BACKGROUND OF THE INVENTION

This invention relates to spark ignited internal combustion engines including apparatus for sensing knock and capable of controlling engine spark timing or some other engine operating parameter to limit such knock to acceptable levels. There has been increasing interest in recent years in engines with such knock sensing and controlling apparatus due to such factors as the lowering of octane in fuels in order to obtain the maximum amount of fuel from crude oil, the elimination of lead compounds from the fuel, the desire to operate engines on the borderline of knock for maximum engine efficiency, the increased use of turbochargers and the desire to produce engines with higher compression ratios and lighter weight for greater power and fuel economy.

The usual knock sensing apparatus includes a vibration or knock sensor fixed to a surface of the engine to sense the vibrations of the engine itself and generate an electrical output signal which may be amplified and processed to improve the signal to noise ratio and then applied to appropriate control apparatus. With respect to engine vibrations, however, the typical spark ignited internal combustion engine is a very noisy environment. Engine vibrations from sources other than knock, such as valve train clatter, piston slap, etc., are often present in amplitude equal to or greater than those vibrations due to knock and can be easily mistaken for knock vibrations by the sensing apparatus.

As a result, most such systems utilize some form of frequency discrimination to take advantage of the fact that knock vibrations appear, in most engines, to occur at a specific frequency for a particular engine construction. Although this is helpful to some extent, it does not fully solve the problem. The knock frequency cannot be fixed too exactly, since it may vary slightly from one engine to the next and even from one cylinder to the next within a specific engine. In addition, many of the engine vibrations due to sources other than knock also may appear at times to have a substantial output within the range of the characteristic knock frequency. Thus, even a well designed system may have some response to spurious engine vibrations incorrectly interpreted as knock with a resultant "false retard", that is, a retard of spark timing with resultant lowering of engine efficiency when no such retard is actually required. Straightforward methods of reducing the tendency of the system to respond to the spurious vibrations, such as analyzing their source and eliminating them or locating the knock sensor to minimize the magnitude of such vibrations at the sensor site have proved to be extremely difficult and generally unsatisfactory.

Research appears to indicate that the characteristic vibrations due to knock involve the excitation of acoustic cavity resonances in the combustion chambers of the engine. Detonations cause the cavity to resonate and thus excite the engine structure. The so-called knock frequency corresponds to the frequency of the first cavity mode of resonance. In practice, this first mode occurs at approximately the same frequency in all cylinders and may vary somewhat with different engine operating conditions. The knock frequency can be determined from a spectral analysis of the combustion chamber pressure when an engine is knocking. Actually, a typical combustion chamber spectrum will produce a time-averaged spectrum that reveals several identifiable peaks; and a time-averaged spectrum of the output of a properly placed, engine mounted accelerometer will show peaks at the same frequencies.

However, for a single cylinder firing event, a spurious vibration may occur at one of these cavity resonance frequencies. Therefore, no matter which of the frequencies is selected as the "knock frequency", there may be some proportion of the detected "knock events" which are spurious and cause "false retard".

SUMMARY OF THE INVENTION

Thus, it is an object of this invention to provide a spark ignited internal combustion engine with at least one combustion chamber and knock control apparatus which advantageously responds to engine vibrations at frequencies corresponding to the cavity resonance modes of the combustion chamber with an improved ability to discriminate between knock-induced and other engine vibrations.

This object is realized in a spark ignited internal combustion engine having at least one combustion chamber characterized by a plurality of cavity resonance modes and vibration sensing means having a portion thereof fixed to the engine for vibration therewith and a tuned response to vibrations of at least two of the aforementioned resonant frequencies with a separate output channel for each tuned resonant frequency. The engine further comprises coincidence sensing apparatus effective to generate a knock signal only when signals are sensed simultaneously on all such channels. Although there is some individual possibility of a spurious response at each frequency, the probability of a spurious response at multiple frequencies simultaneously is much smaller than the probability at each frequency separately. The invention may include in its various embodiments a single vibration sensor or accelerometer having acceptable response at all of the desired frequencies with the output therefrom split among a plurality of parallel channels, each electronically tuned to one of the desired frequencies; or it may comprise a separate mechanically or electrically tuned vibration sensor for each channel.

Further details and advantages of this invention will be apparent from the accompanying drawings and following description of a preferred embodiment.

DESCRIPTION OF THE PREFERRED EMBODIMENT

Figure 9:
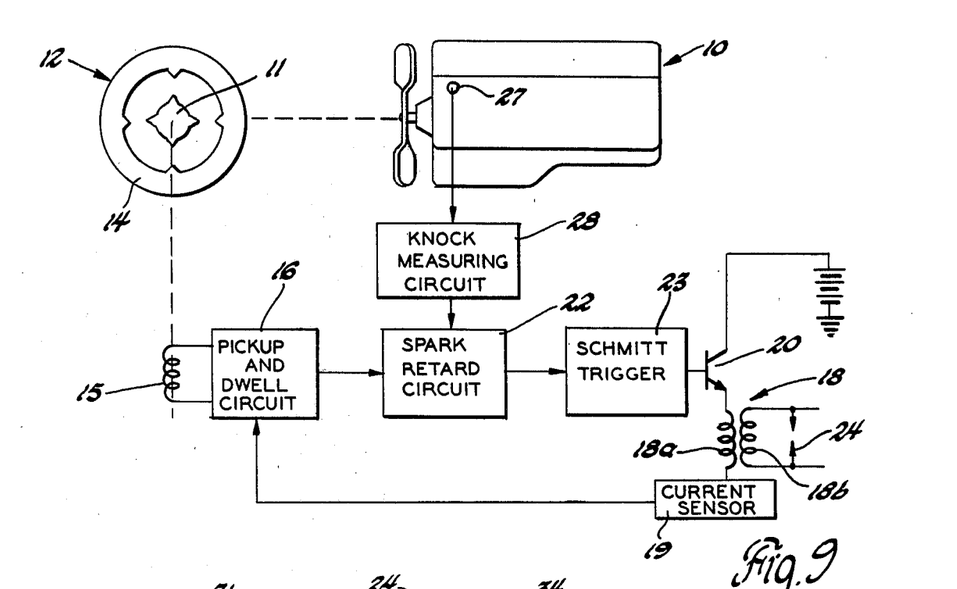
FIG. 9 shows a partly outline and partly block diagram of an engine with a knock sensing system according to this invention.

Referring first to FIG. 9, a four cylinder, in-line, spark ignited, internal combustion engine 10 has a rotating crankshaft which drives the rotor 11 of an alternating current signal generator 12. Generator 12 is a standard spark timing signal generator of the variable reluctance type disclosed and described in the U.S. Pat. No. 3,254,247 to Falgy, which issued May 31, 1966. Generator 12 also includes a stator 14 and a pickup coil 15 and provides a plurality of equally spaced projections around rotor 11 and stator 14 related to the number of cylinders in engine 10. Relative rotation between the rotor 11 and stator 14 at a speed proportional to engine speed produces a pulsating variation in reluctance which induces an alternating voltage signal in coil 15.

The alternating voltage signal in coil 15 is applied to pickup and dwell circuit 16, which generates normal spark timing pulses. These normal park timing pulses may be applied to a Schmitt trigger 23 to control a switching transistor 20 connected to switch current on and off in the primary 18a of a spark coil 18. The flow of current in primary 18a causes electromagnetic energy to build up in spark coil 18; and this energy is released, when transistor 20 cuts off current in primary 18a, in the form of a high voltage spark pulse in coil secondary 18b applied to spark plug 24 through a distributor, not shown. A current sensor 19 provides feedback to pickup and dwell circuit 16 to control the dwell time of current conduction in primary 18a. The system so far described is one well known in the art and shown in the U.S. Pat. No. 3,828,672, to Richards et al. issued Oct. 1, 1974.

In order to selectively retard the spark timing in response to an engine knock signal, spark retard circuitry 22 is inserted between pickup and dwell circuit 16 and Schmitt trigger 23. Apparatus suitable for use in such circuit is shown in the U.S. Pat. No. 4,106,447, to Gene A. West issued Aug. 15, 1978. However, other appropriate spark retard circuits are well known.

Figure 5:
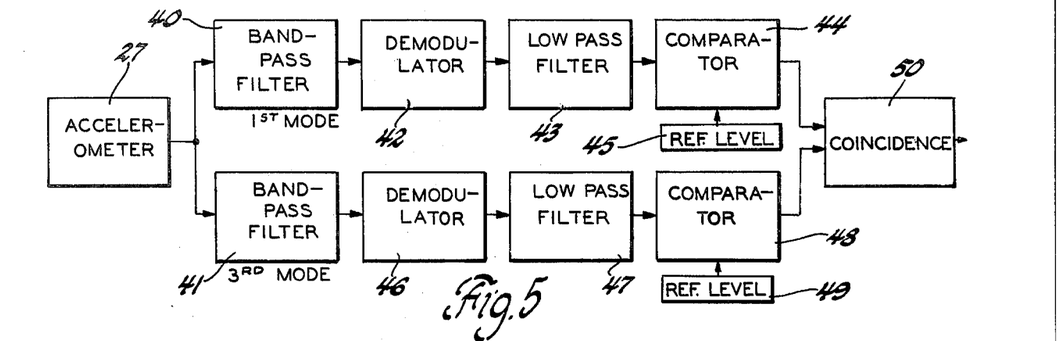
FIGS. 5, 6 and 7 show block diagrams of embodiments of a portion of the apparatus of this invention.

Engine 10 is provided with a vibration or detonation sensor 27, which is preferably mounted on the engine block, intake manifold or some other component of engine 10. The precise location of sensor 27 is determined by experiment for a particular engine so that it is sensitive to knock from all cylinders of the engine and preferably has the minimum possible sensitivity to noise. Sensor 27 includes a threaded stud which is tightened into a threaded depression within a mounting boss formed at the desired location. In the development of the preferred embodiment of this invention, to this date, the sensor used for sensor 27 has been a B and K accelerometer type 4343 attached to the engine block with a threaded stud. If a single accelerometer is used as shown in FIG. 5, it is important that it be capable of significant response at the various frequencies of the acoustic cavity resonance modes for which channels are provided, such as, in the embodiment of FIG. 5, 6.7 and 12.5 kilohertz. The type of tuned knock sensor shown in the U.S. Pat. No. 4,161,655 issued to Charles E. Buck et al on July 17, 1979 is more appropriate to the embodiment of FIG. 6, to be described below. In the embodiment of FIG. 5, the sensor has been located near the upper right front corner of the engine block; and this location has, so far, appeared to satisfy the objectives of sensor location mentioned above.

The output signal from vibration sensor 27 is provided to knock measuring circuitry 28, in which a knock intensity signal is generated for application to spark retard circuit 22 to control the retard of the spark timing from the normal spark timing. This normal timing is determined in the standard manner, either by mechanical centrifugal and vacuum advance rotation of stator 14 or by additional electronic circuitry with vacuum and engine speed inputs, in pickup and dwell circuit 16. It is also possible for spark retard circuit 22 to take the form of a programmed digital computer which determines the total retard from reference pulses developed by pickup and dwell circuit 16 with appropriate inputs from manifold vacuum, engine speed and knock detection circuit 28. Apparatus for use as knock measuring circuit 28 is shown in alternative block diagram form in FIGS. 5–7 and partially in circuit form in FIG. 8.

Figure 10:
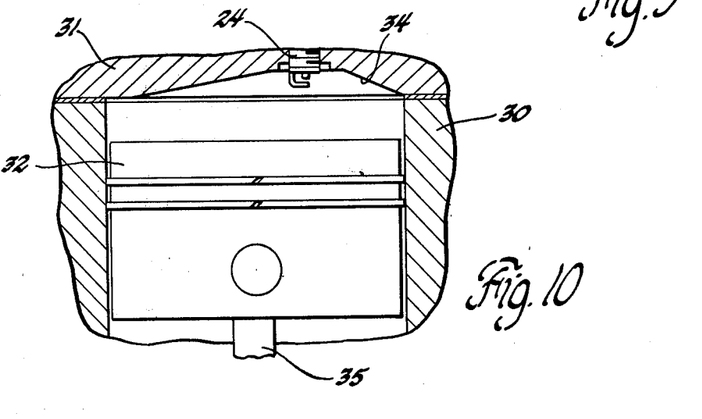
FIG. 10 shows a partial sectional view of a cylinder of the engine shown in FIG. 9.
Figure 11:
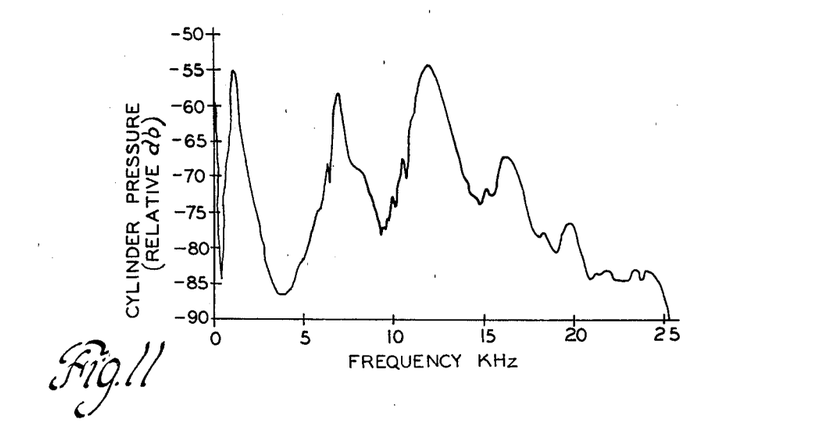
FIG. 11 shows a time-averaged frequency spectrum of cylinder pressure for a cylinder in an engine such as that shown in FIG. 9.

FIG. 10 shows a section view of one of the cylinders of engine 10 with a cylinder block 30 and cylinder head 31 forming a cylindrical volume in which a piston 32 moves axially. Cylinder block 30, cylinder head 31 and piston 32 defines a cylinder volume 34 which varies in size with the position of piston 32. Piston 32 is connected to the crankshaft of engine 10 by a crankpin 35 and the top dead center position of piston 32 or of the crankshaft with respect to piston 32 is defined as the position of minimum size for the cylinder volume 34, which is the highest position of piston 32. A spark plug 24 is provided for the cylinder to initiate ignition when fired and the spark plug 24 is generally fired some time just before top dead center of piston 32. At the time spark plug 24 is fired, the cylinder volume 34 will be of a particular size which is a function of the axial position of piston 32 and therefore of the crank angle of the crankshaft of engine 10 relative to top dead center for piston 32. The particular size and shape of cylinder volume 34 will help determine the acoustic cavity resonance frequencies of the volume. An example for the engine of this embodiment is shown in FIG. 11. If the frequencies below 5 kilohertz are ignored, FIG. 11 shows a first acoustic cavity resonance at approximately 7 kilohertz. There is a second, smaller peak at approximately 8 kilohertz which mostly blends with the first peak. In addition, there is a very high third peak at approximately 12.5 kilohertz and lower fourth and fifth peaks at 16.5 and 20 kilohertz, respectively. The plot of FIG. 1 was obtained by time averaging the output of a cylinder pressure sensor sensitive to the pressure within a cylinder of engine 10.

One system for accomplishing the foregoing is shown in FIG. 5. An accelerometer or detonation sensor 27 provides an output signal to a pair of bandpass filters 40 and 41, the former tuned to a frequency of 6.7 kilohertz and the latter tuned to a frequency of approximately 12.5 kilohertz. The output from bandpass filter 40 is sent through a demodulator 42, a low pass filter 43 with a half power frequency of approximately 2000 hertz and a comparator 44 with a reference signal provided from reference level source 45. The output from bandpass filter 41 is provided through demodulator 46 and low pass filter 47 with a half power frequency of approximately 2000 hertz to comparator 48, which receives a reference signal from reference level source 49. The outputs of comparators 44 and 48 are provided to coincidence circuit 50, which could take the form of an AND gate. In each of the channels following one of the bandpass filters, the demodulator and low pass filter remove the high frequency component of the knock signal and leave the envelope of the knock burst. The low pass filter may also be a multipole filter with two to four poles and a half power frequency between 90 and 200 hertz, at least for the 7 kilohertz channel. In this case it also may help to distinguish between a knock burst and a burst of noise having a different envelope shape and duration. Comparator 44 compares the amplitude of the processed envelope of the knock or other bursts with the reference level, which may be a moving reference level obtained as shown in the aforementioned Gene A. West reference, and generates an output pulse having a duration equal to the duration of the signal at a level above the reference level. If such pulses occur simultaneously at the outputs of both comparators, 44 and 48, an output pulse will be generated by coincidence circuit 50 and knock will thus be detected.

Figure 6:
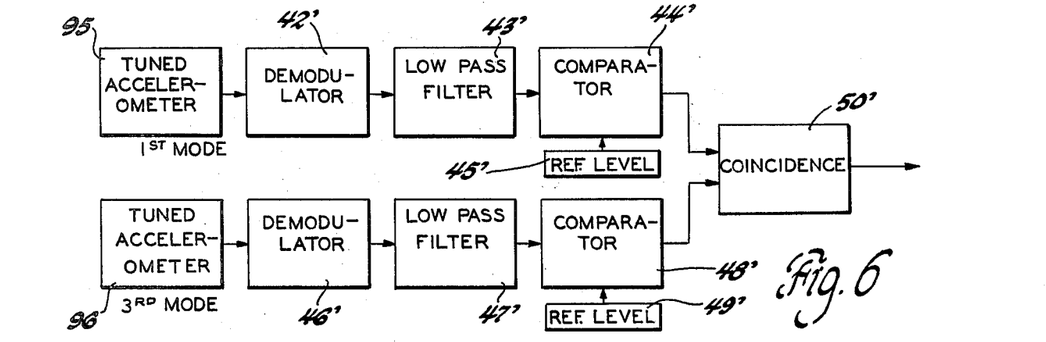

An alternative system is shown in FIG. 6. This system uses two separate accelerometers or detonation sensors 95 and 96, each of which is mechanically tuned with a resonant frequency corresponding to one of the acoustic cavity resonance frequencies of the engine 10, such as 7 and 12.5 kilohertz. The signal from accelerometer 95 is provided through a demodulator 42', a low pass filter 43' and a comparator 44' to coincidence circuit 50'. The signal from tuned accelerometer 96 is provided through a demodulator 46', a low pass filter 47' and comparator 48' to coincidence circuit 50'. Reference level sources 45' and 49' provide the reference signals for comparators 44' and 48', respectively. Each of the primed elements is substantially identical with the similarly numbered unprimed element of FIG. 5.

Figure 7:
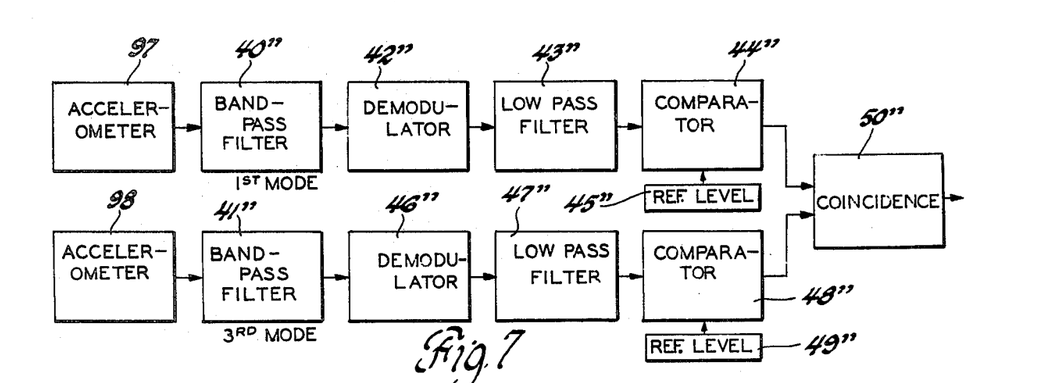

A further alternative is shown in FIG. 7 in which untuned accelerometers 97 and 98 provide output signals through channels substantially identical with those shown in FIG. 5 and having similarly numbered double prime blocks.

The performance of the apparatus of this invention can be understood with reference to FIGS. 1-4, which show time and frequency plots of cylinder pressure and engine vibration for a single cylinder in the engine of this embodiment: a 1.6 liter, four cylinder engine produced by General Motors Corporation. Plots a-d of each Figure are time data; and each comprises a total of 12.5 milliseconds or one half engine revolution at 2400 RPM. Plots e and f of each Figure show frequency spectra of cylinder pressure and engine acceleration, respectively, corresponding to the time data of plots a-d.

FIG. 1 shows the appropriate data for an engine firing event which included no audible knock. The cylinder pressure time plot of FIG. 1a shows very little high frequency content, as does the accelerometer output time plot of FIG. 1b. The time plot of FIG. 1c represents the low pass filtered signal at the first acoustic cavity resonance frequency corresponding to the output of low pass filter 43 in FIG. 5. This plot shows practically no response, except for a very slight blip between 4 and 5 milliseconds, which may be a result of the spurious vibration event shown at 4 milliseconds in plot 1b.

Figure 1A:
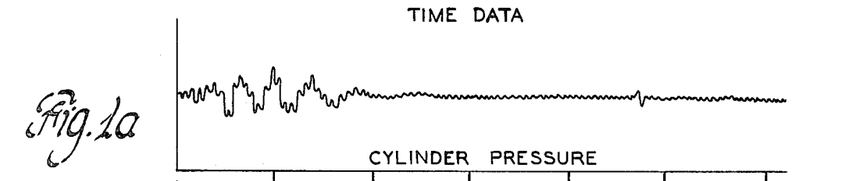
FIGS. 1a-f, 2a-f, 3a-f and 4a-f show time and frequency plots of the relative amplitude of cylinder pressure and engine vibration for selected cylinder firings of a single cylinder of a four cylinder engine. In each of the numbered Figures, plots a-d are time plots of, respectively, the cylinder pressure, the unfiltered engine accelerometer output, the filtered accelerometer output at the first acoustic cavity vibration mode frequency and the filtered accelerometer output at the third acoustic cavity resonance mode frequency. In addition, plot e is the frequency spectrum for cylinder pressure and plot f is the frequency spectrum for accelerometer output.
Figure 1B:
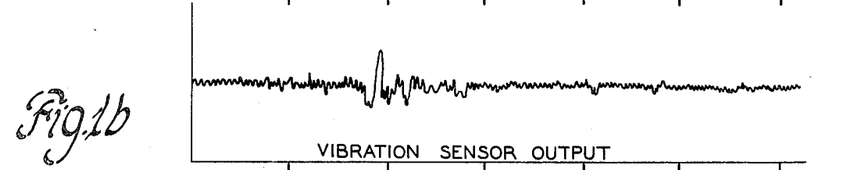
Figure 1C:
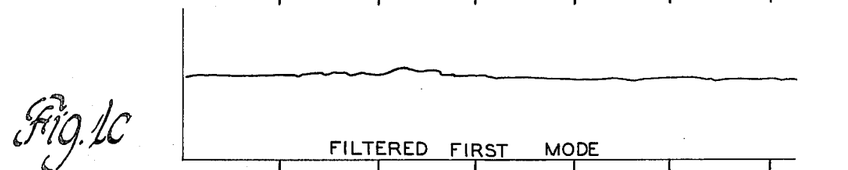
Figure 1D:
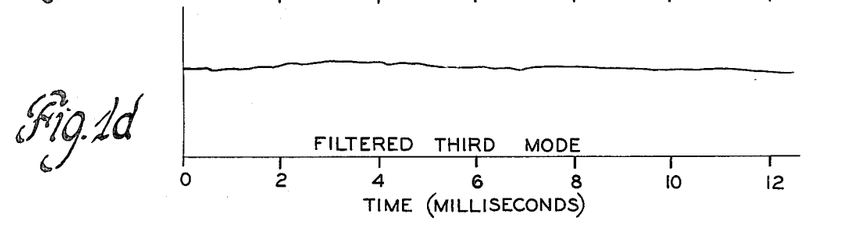

The plot of FIG. 1d is a low pass filtered accelerometer output at the third acoustic cavity resonance frequency which corresponds to the output of low pass filter 47 in FIG. 5. This plot shows no significant variation during the 12 millisecond period.

Figure 1E:
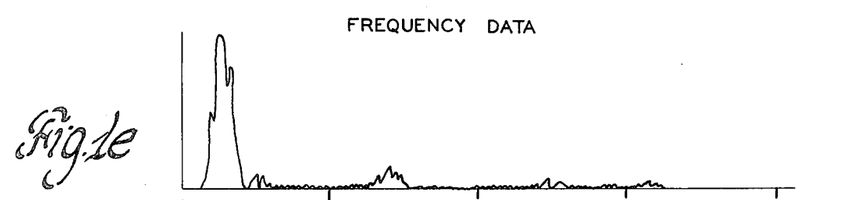
Figure 1F:
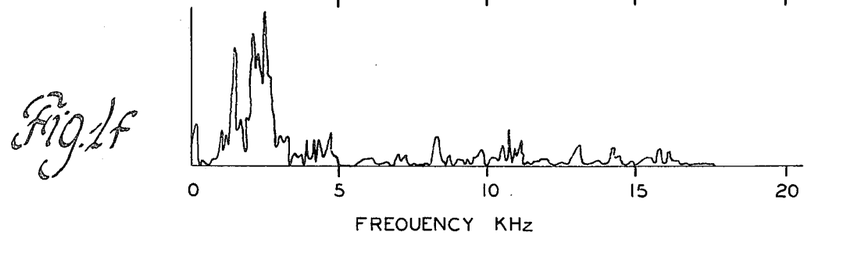
Figures 2A, 2B, 2C:
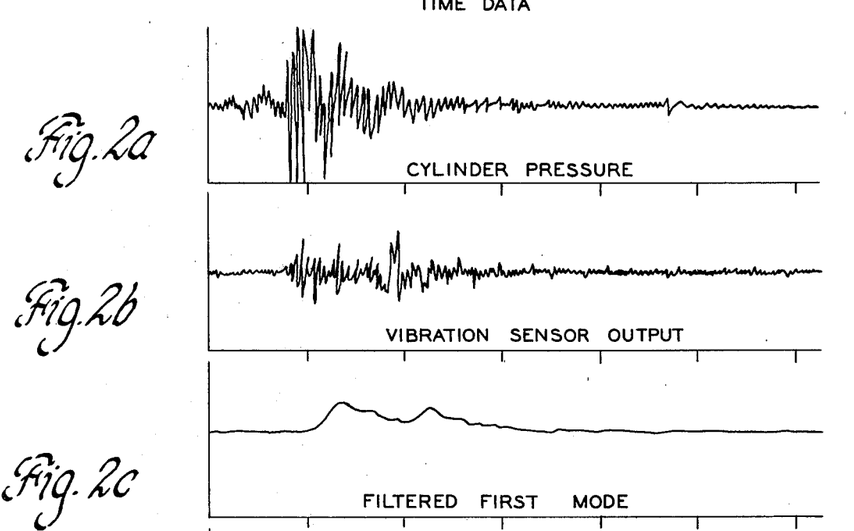
Figure 2D:
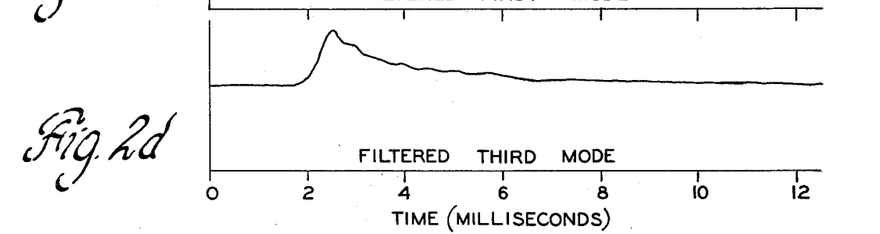
Figure 2E:
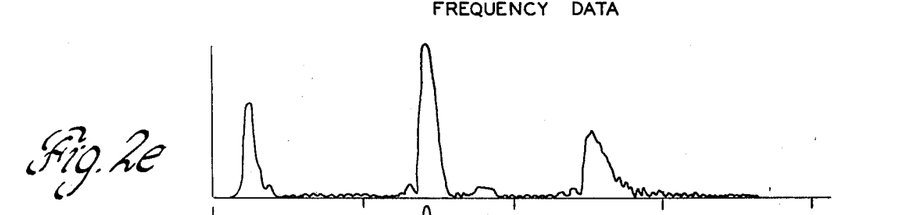
Figure 2F:
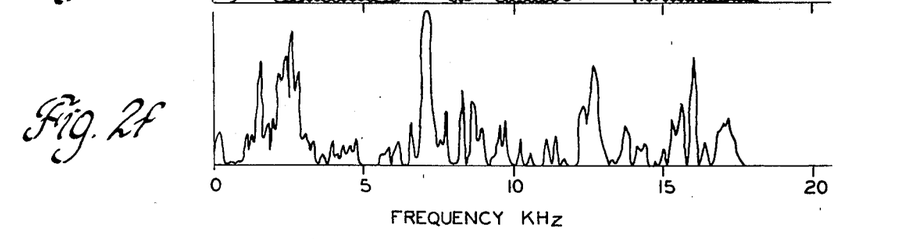
Figure 3A:
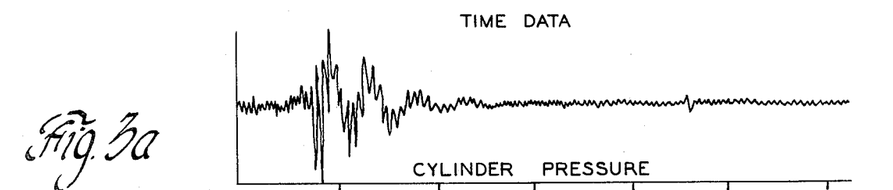
Figure 3B:
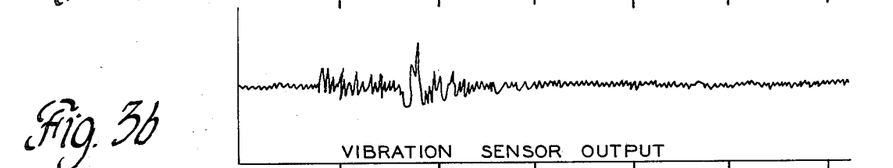
Figure 3C:
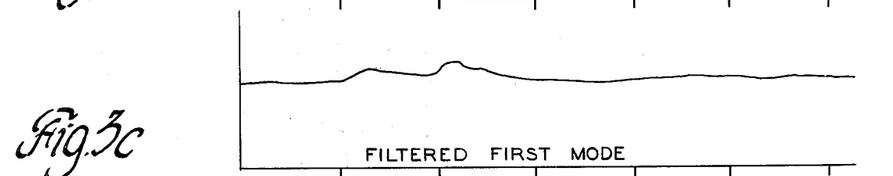
Figure 3D:
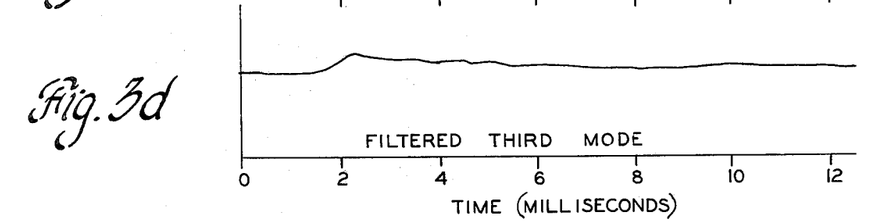
Figure 3E:
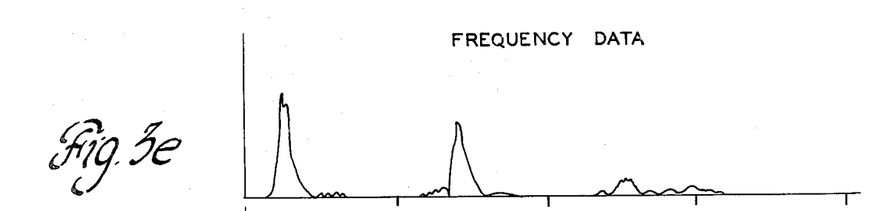
Figure 3F:
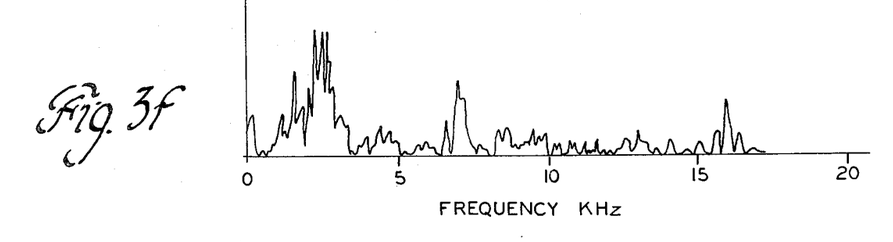
Figure 4A:
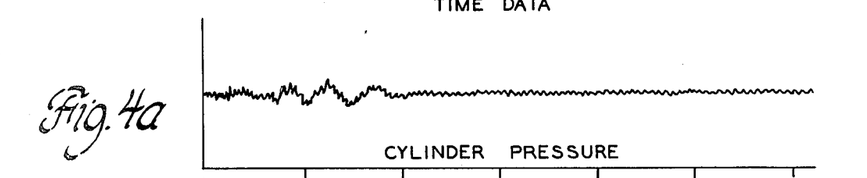
Figure 4B:
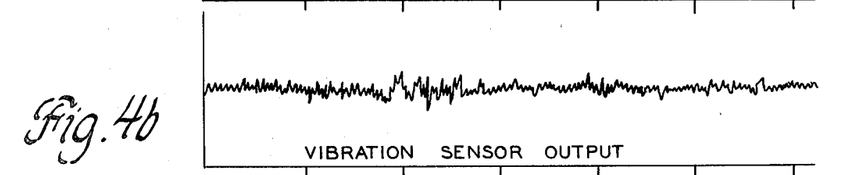
Figure 4C:
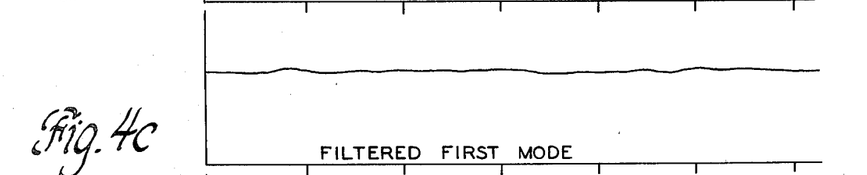
Figure 4D:
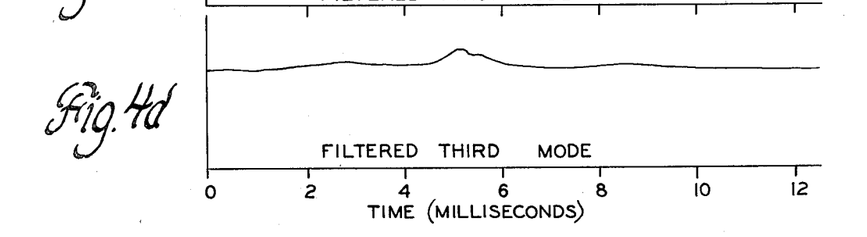
Figure 4E:
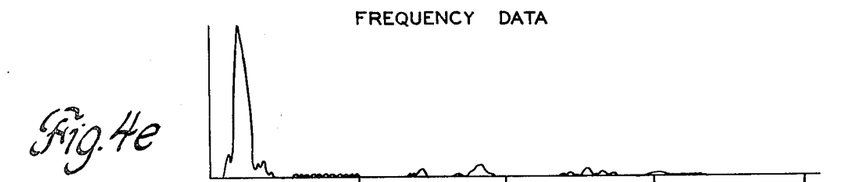
Figure 4F:
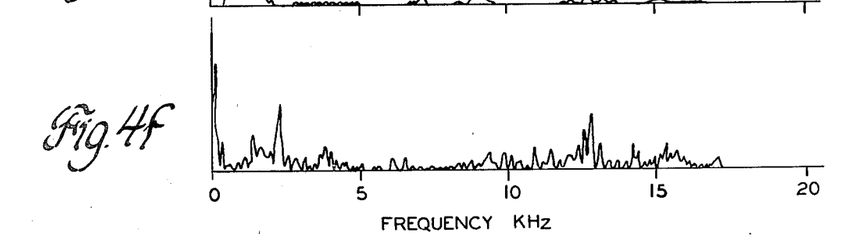

Plots 1e and 1f show frequency spectra of the cylinder pressure and unfiltered accelerometer output for the time data of plots 1a-1d. Both frequency spectra show substantial low frequency output, which can be seen in plot 1a in particular, but very little response at the acoustic cavity resonance frequencies of 7 and 12.5 kilohertz. The system of this invention would respond to this engine firing event correctly by sensing no knock.

FIG. 2 shows similar data for an engine firing event in which a substantial audible knock occurred. One can see substantial high frequency output in the time plots of cylinder pressure and unfiltered accelerometer output in FIGS. 2a and 2b. One can similarly see a substantial increase between 2 and 3 milliseconds in the filtered accelerometer output at both the first and second acoustic cavity resonant frequencies, as seen in FIGS. 2c and 2d. The second hump in FIG. 2c between 4 and 5 milliseconds may be a spurious vibration not connected with knock. The frequency spectra of plots 2e and 2f show clearly the acoustic cavity resonance peaks in the cylinder pressure spectrum and corresponding peaks in the unfiltered accelerometer output at approximately 7 and 12.5 kilohertz. The system of this invention would properly have detected knock in this particular firing event.

Although the apparatus of this invention would have properly determined whether or not knock had occurred in the engine firing events illustrated in FIGS. 1 and 2, a good many other knock sensing systems might have also been similarly successful, since the events were rather clean and well-defined knock and no-knock events. FIGS. 3 and 4, however, present data obtained for events in which no significant audible knock was present but spurious engine vibrations produced a substantial accelerometer output at one of the acoustic cavity resonance frequencies.

FIG. 3 shows data for a cylinder firing event in which some low magnitude knock was undoubtedly present, as seen in the high frequency content of plots 3a and 3b and the rise in plots 3c and 3d between 2 and 3 milliseconds. However, a comparison with the similar plots of FIG. 2 shows these characteristics to be substantially reduced in this particular engine firing event. However, this engine firing event also shows, as seen in plots 3b and 3c a spurious engine vibration at 4 to 5 milliseconds that, particularly, when "piggy-backed" on top of the slight rise in plot 3c due to the trace knock, may have been sufficient to cause a system responding only at the first acoustic resonance frequency to believe that a strong knock had occurred. However, since no such spurious response showed up at the third acoustic resonance frequency plot of 3d, the apparatus of this invention would not have made this mistake.

FIG. 4 shows data for an engine firing event in which no knock occurred, as seen in particular in the absence of high frequency information in plot 4a, the flatness of plot 4c and the absence of any significant cylinder pressure variation at either of the acoustic resonance frequencies as seen in plot 4e. However, a spurious vibration did occur and produced a significant output at the third acoustic resonance mode frequency of 12.5 kilohertz, as seen in the time plot of FIG. 4d and the frequency spectrum of FIG. 4f. A standard knock sensing system tuned to the third acoustic cavity resonance frequency of 12.5 kilohertz may have falsely responded to this engine firing event with an indication of knock, but the apparatus of this invention would correctly have not so responded.

Figure 8:
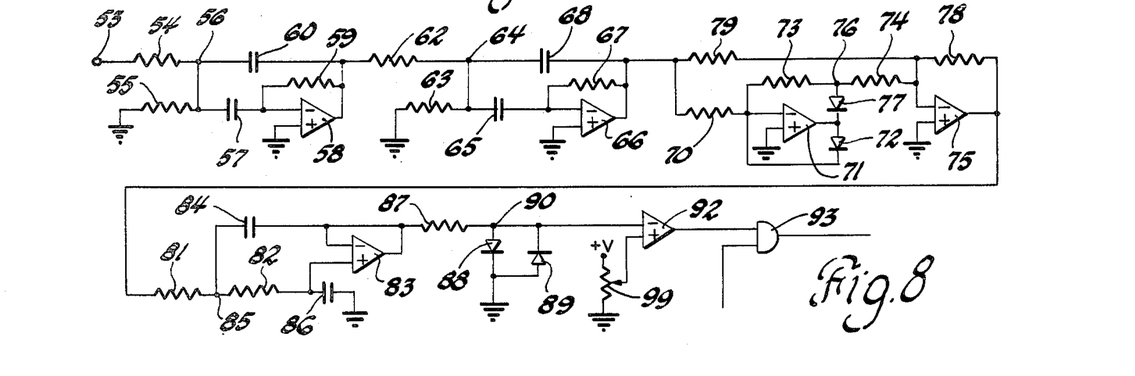
FIG. 8 shows a circuit diagram of a particular embodiment of a portion of the system shown in FIG. 5.

A circuit for use as one of the channels of the system shown in FIG. 5 is itself shown in FIG. 8. Input terminal 53 corresponds to the input of bandpass filter 40 and is connected through a resistor 54 and resistor 55 in series therewith to ground. The junction 56 of resistors 54 and 55 is connected through a capacitor 57 to the inverting input of an operational amplifier 58 having a non-inverting input grounded and an output connected through a resistor 59 to the inverting input and through a capacitor 60 to junction 56.

The output of op amp 58 is further connected through a resistor 62 and resistor 63 in series to ground. The junction 64 of resistors 62 and 63 is connected through a capacitor 65 to the inverting input of an op amp 66 having a grounded noninverting input and an output connected back through a resistor 67 to the inverting input and through a capacitor 68 to junction 64. The components cited to this point comprise a pair of cascaded bandpass filters, each having a Q of approximately 14 and given component values for stagger tuning at frequencies of 6.568 and 7.040 kilohertz, for a combined tuning of 6.8 kilohertz.

The output of op amp 66 is further connected through a resistor 70 to the inverting input of an op amp 71 having a grounded noninverting input. The output of op amp 71 is connected back through a diode 72 to the inverting input which is, in turn, connected through a series pair of resistors 73 and 74 to the inverting input of another op amp 75, having a grounded noninverting input. The junction 76 of resistors 73 and 74 is connected to the output of op amp 71 through a diode 77; and the output of op amp 75 is connected through a resistor 78 to the inverting input thereof, which is further connected through a resistor 79 to the output of op amp 66. These elements comprise a precision full wave rectifier demodulator.

The output of op amp 75 is connected through a series pair of resistors 81 and 82 to the noninverting input of an op amp 83 having an inverting input connected through a capacitor 84 to the junction 85 of resistors 81 and 82. The noninverting input is further connected to a capacitor 86 to ground and the inverting input is connected directly to the output and through a resistor 87 and alternately oriented parallel diodes 88 and 89 to ground. These elements comprise a second order low pass filter having a half power frequency of 166 hertz followed by a diode limiter for protection.

The junction 90 of resistor 87 and diodes 88 and 89 is connected to one input of a comparator 92, the other input of which is provided with a reference voltage from a reference voltage source comprising an adjustable potentiometer 99 connected between ground and some constant reference voltage +V. This way of providing a reference voltage is more suitable for a laboratory experiment of the system and would be replaced in an actual engine application with apparatus as shown in the aforementioned Gene A. West patent. The ouput of comparator 92 is provided to one input of an AND gate 93, the other input of which receives the output of similar circuitry for the other channel.

Component values for the circuit of FIG. 8 are as follows:

| | |
|---|---|
| Resistors: | 54 - 34.26K, 1% |
| | 55 - 85.9, 1% |
| | 59 - 68.53K, 1% |
| | 62 - 31.97K, 1% |
| | 63 - 81.1, 1% |
| | 67 - 63.93K, 1% |
| | 70,73,74,78,79 - 5K |
| | 81,82 - 6.779K, 1% |
| | 87 - 4K |
| | 99 - 10K potentiometer |
| Capacitors: | 57,60,65,68 - 0.01 microfarad 1% |
| | 84 - 0.2 microfarad 1% |
| | 86 - 0.1 microfarad 1% |
| Others: | 58,66,71,75 - type 747 |
| | 83 - type 741 |
| | 92 - CA3140 |
| | 72,77,88,89 - 1N458 |
| | 93 - 7408 |

Although the circuit of FIG. 8 shows a preferred embodiment of a circuit for use in this invention, the time and frequency curves of FIGS. 1–4 were produced with apparatus which included a Krohn-hite model 3750 bandpass filter set to 7 kHz and 13 kHz with 18 dB/octave rolloff. In addition, the low pass filter was a Precision Filters Inc. System 616 anti-alias filter with a gain of 1 and a half power or cutoff frequency of 2000 Hz.

Although the embodiment shown is preferred at this time, equivalent embodiments will occur to those skilled in the art, and this invention should be limited only by the claim which follows.

The embodiments of the invention in which an exclusive property or privilege is claimed are defined as follows:

1. In combination:

a spark ignited internal combustion engine having at least one combustion chamber characterized by a plurality of cavity resonance modes and excitable by knock to vibrate in these resonance modes at resonance frequencies corresponding thereto, the engine being responsive to these knock-induced vibrations to vibrate therewith at the resonance frequencies and further being responsive to other events to vibrate at frequencies which may include one of the resonance frequencies;

vibration sensing means having a tuned response to vibrations at a plurality of the resonance frequencies, said means having a portion fixed to the engine for vibration therewith and having a plurality of output channels, one for each said tuned resonance frequency, on which channel is generated a signal when vibrations are sensed at that frequency;

signal processing apparatus for each output channel operative in response to said signals, respectively; and coincidence sensing means effective to generate a knock signal only when the signal processing apparatus indicates significant vibrations simultaneously on all channels, whereby knock induced vibrations may be more reliably distinguished from other vibrations, even if they share one of the resonance frequencies.

2. In combination:

a spark ignited internal combustion engine having at least one combustion chamber characterized by a plurality of cavity resonance modes and excitable by knock to vibrate in these resonance modes at resonance frequencies corresponding thereto, the engine being responsive to these knock induced vibrations to vibrate therewith at the resonance frequencies and further being responsive to other events to vibrate at frequencies which may include one of the resonance frequencies;

vibration sensing means affixed to said engine and being responsive to vibrations at a plurality of said resonance frequencies to generate electrical signals in response thereto; and means responsive to said sensing means and effective to generate a knock signal only when significant vibrations at a predetermined number greater than one of said resonance frequencies are simultaneously received therefrom, whereby knock induced vibrations may be more reliably distinguished from other vibrations, even if they share one of the resonance frequencies.

* * * * *